(12) United States Patent
Asai et al.

(10) Patent No.: US 11,830,364 B2
(45) Date of Patent: Nov. 28, 2023

(54) DRIVING ASSIST METHOD AND DRIVING ASSIST DEVICE

(71) Applicant: Nissan Motor Co., Ltd., Yokohama (JP)

(72) Inventors: Toshihiro Asai, Kanagawa (JP); Takahiro Nojiri, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 557 days.

(21) Appl. No.: 17/265,551

(22) PCT Filed: Sep. 11, 2018

(86) PCT No.: PCT/IB2018/001126
§ 371 (c)(1),
(2) Date: Feb. 3, 2021

(87) PCT Pub. No.: WO2020/053614
PCT Pub. Date: Mar. 19, 2020

(65) Prior Publication Data
US 2021/0327276 A1  Oct. 21, 2021

(51) Int. Cl.
*G08G 1/16* (2006.01)
*G08G 1/01* (2006.01)

(52) U.S. Cl.
CPC ........... *G08G 1/163* (2013.01); *G08G 1/0133* (2013.01); *G08G 1/0145* (2013.01); *G08G 1/166* (2013.01)

(58) Field of Classification Search
CPC .... G08G 1/163; G08G 1/0133; G08G 1/0145; G08G 1/166; G08G 1/16; G06V 20/582; B60W 2050/0086; B60W 2420/42; B60W 2554/20; B60W 2554/4048; B60W 2554/406; B60W 2554/802; B60W 2555/60; B60W 2556/25; B60W 2556/40; B60W 2556/45; B60W 2556/50; B60W 50/0225; B60W 2050/0215; B60W 50/0205; B60W 50/14; B60W 60/0053;
(Continued)

(56) References Cited

U.S. PATENT DOCUMENTS

2014/0288799 A1* 9/2014 Elwart ............... B60W 40/09
701/1

FOREIGN PATENT DOCUMENTS

| JP | 2006-178694 A | 7/2006 |
| JP | 2015-114126 A | 6/2015 |

\* cited by examiner

*Primary Examiner* — Alan D Hutchinson
(74) *Attorney, Agent, or Firm* — Global IP Counselors, LLP

(57) ABSTRACT

A driving assist method reduces a possibility of missing an opportunity to correct a host vehicle position set on map data. In the driving assist method using a controller that sets a target inter-vehicular distance from a host vehicle to a preceding vehicle, whether there is a request to execute a correction of a host vehicle position set on electronic map data is determined based on a result of comparing position information on a road sign described on the electronic map data with position information on the road sign acquired by using a camera installed in the host vehicle. If an execution request has not been made, the target inter-vehicular distance is set to a preset first target inter-vehicular distance. If an execution request has been made, the target inter-vehicular distance is set to a second target inter-vehicular distance, which is longer than the first target inter-vehicular distance.

7 Claims, 9 Drawing Sheets

(58) Field of Classification Search
CPC ........... B60W 2754/30; B60W 60/0015; G01S 2013/9321; G01S 13/931; G01C 21/28; G01C 21/32; G01C 21/36; H04N 1/00
See application file for complete search history.

DRIVING ASSIST METHOD AND DRIVING ASSIST DEVICE

CROSS-REFERENCE TO RELATED APPLICATIONS

This application is a U.S. national stage application of International Application No. PCT/IB2018/001126, filed on Sep. 11, 2018.

BACKGROUND

Technical Field

The present invention relates to a driving assist method and a driving assist device.

Background Information

A host vehicle position detection device that compares the shape of a road marking, which is present in the vicinity of the host vehicle and which is recognized on the basis of photographic information from a photographing device attached to a host vehicle, with the shape of a road marking that is included in a map image to thereby correct the absolute position of the host vehicle, is known from the prior art (for example, see Japanese Laid-Open Patent Application No. 2015-114126 hereinafter referred to as Patent Document 1).

SUMMARY

Here, with the conventional host vehicle position detection device, it is necessary to recognize the shape of the road marking based on photographic information in order to correct the absolute position of the host vehicle. However, there are cases in which it is not always possible to correct the absolute position of the host vehicle because the shape information of the road marking necessary for the correction is not always included in the photographic information. In particular, at the time of following travel during traffic congestion, the host vehicle will approach a preceding vehicle that is traveling immediately in front of the host vehicle, following the preceding vehicle more closely than during normal travel (when there is no traffic congestion). Consequently, there is the possibility that a road marking will be hidden by the preceding vehicle and the road marking cannot be appropriately photographed by the photographing device, so that an opportunity to make a correction is lost.

Given the problem described above, an object of the present disclosure is to provide a driving assist method and a driving assist device that can reduce the probability of missing an opportunity to correct the host vehicle position set on map data.

In order to realize the object described above, the present disclosure is a driving assist method using a controller that sets a target inter-vehicular distance from a host vehicle to a preceding vehicle traveling immediately in front of the host vehicle.

Here, the controller determines whether there is a request to execute a correction of the host vehicle position set on map data, which is executed based on a result of comparing information related to a target described on the map data with information related to the target acquired by using an on-board sensor installed in the host vehicle. Upon determining that an execution request has not been made, then the target inter-vehicular distance is set to a first target inter-vehicular distance that has been set in advance. If, on the other hand, it is determined that an execution request has been made, the target inter-vehicular distance is set to a second target inter-vehicular distance that is longer than the first target inter-vehicular distance.

Therefore, in the present disclosure, it is possible to reduce the probability of missing an opportunity to correct the host vehicle position set on the map data.

BRIEF DESCRIPTION OF THE DRAWINGS

Referring now to the attached drawings which form a part of this original disclosure.

DETAILED DESCRIPTION OF EMBODIMENTS

Figure 1:
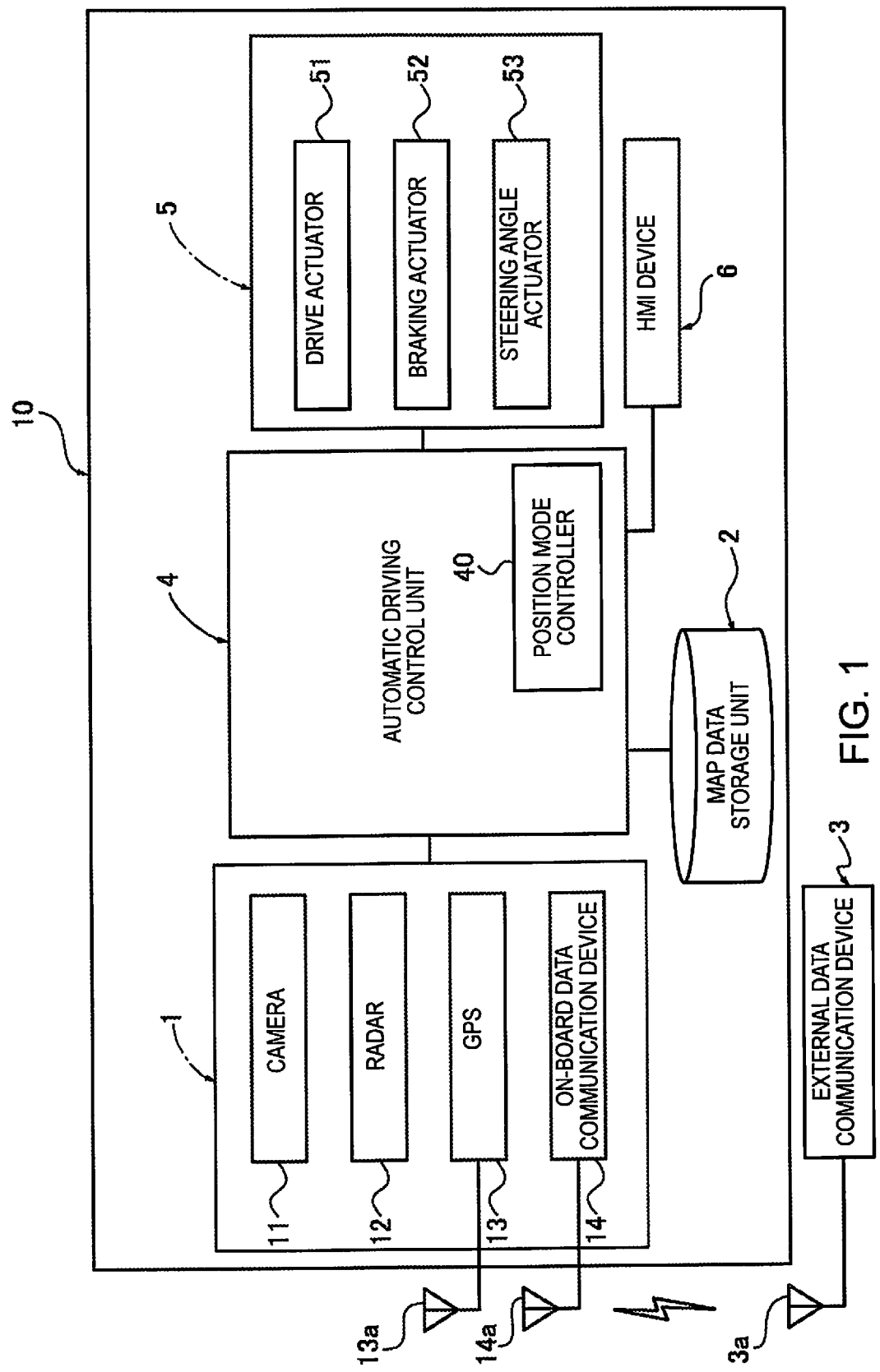
FIG. 1 is an overall system view illustrating an automatic driving control system to which are applied a driving assist method and a driving assist device according to a first embodiment.

An embodiment for implementing the driving assist method and the driving assist device according to the present disclosure will be described below based on a first embodiment illustrated in the drawings.

First Embodiment

The driving assist method and the driving assist device according to the first embodiment are applied to an automatic driving vehicle (one example of a driving-assisted vehicle) in which driving, braking, and steering angle are automatically controlled so as to travel along a generated target travel route when an automatic driving mode is selected. An "overall system configuration," a "control block configuration of a position mode controller," a "configuration of a position mode selection control process," and a "configuration of a traffic congestion determination control process" will be described separately below, regarding the configuration of the first embodiment.

The overall system configuration of the first embodiment will be described below with reference to FIG. 1.

An automatic driving system 10 comprises an on-board sensor 1, a map data storage unit 2, an external data communication device 3, an automatic driving control unit 4, an actuator 5, and an HMI device 6.

The on-board sensor 1 includes a camera 11, a radar 12, a GPS 13, and an on-board data communication device 14. Sensor information (host vehicle surroundings information) acquired with the on-board sensor 1 is output to the automatic driving control unit 4. The on-board sensor 1 includes sensors for acquiring host vehicle information, such as vehicle speed, accelerator opening degree, steering angle, and the like.

The camera 11 is a peripheral environment recognition sensor that realizes a function to acquire, based on image data obtained by photographing, information on the surroundings of the host vehicle such as that regarding lanes, preceding vehicles, pedestrians, and the like, as a function required for automatic driving. This camera 11 is configured by, for example, combining a front recognition camera, a rear recognition camera, a right recognition camera, a left recognition camera, and the like of the host vehicle.

The camera 11 detects host vehicle surroundings information such as objects on a host vehicle travel path, such as road markings, white road lines, road boundaries, stop lines, pedestrian crossings, curbs, and the like, and objects outside of the host vehicle travel path, such as road structures, preceding vehicles, trailing vehicles, oncoming vehicles, surrounding vehicles, pedestrians, bicycles, two-wheeled vehicles, road signs, traffic lights, road information boards, and the like. The camera 11 has a photographable range, which is determined by the lens viewing angle, and this photographable range becomes the detection range from which information on the target can be acquired. Here, a "target" is, from among objects described in map data, an object that acts as a reference when correcting the host vehicle position on the map data. Specifically, it is an object whose position information is a point and that can be used as a reference for correcting the self-location, such as road signs, stop lines, white road lines that are drawn at a merging point and that extend in directions different from lanes, signboards, and the like.

The radar 12 is a ranging sensor that realizes a function of detecting the presence of an object in the vicinity of the host vehicle using output radio waves, and a function of detecting the distance to the object in the vicinity of the host vehicle, as functions required for automatic driving. That is, the radar 12 detects the position information of objects in a host vehicle travel path and objects outside of the host vehicle travel path, as well as distance information from the host vehicle to each of the objects. The radar 12 has a range from which objects can be detected, which is determined by the output range of the radio waves, and this detectable range becomes the detection range from which information on the target can be acquired.

Here, "radar 12" is a generic term that includes radars using radio waves, lidars using light, and sonars using ultrasonic waves. Examples of a radar 12 that can be used include a laser radar, a millimeter wave radar, an ultrasonic radar, a laser range finder, or the like. This radar 12 is configured by, for example, combining a front radar, a rear radar, a right radar, a left radar, and the like of the host vehicle.

The GPS 13 is a host vehicle position sensor that has a GNSS antenna 13a and that detects the host vehicle position information (latitude and longitude) by using satellite communication. "GNSSS" is an acronym for "Global Navigation Satellite System" and "GPS" is an acronym for "Global Positioning System." In addition, the host vehicle position detection accuracy of the GPS 13 may decrease in places where there are a relatively large number of buildings and tunnels. Therefore, in such cases, the host vehicle position information is calculated and estimated based on information from the camera 11, the radar 12, and dead reckoning, in the automatic driving control unit 4.

The on-board data communication device 14 is an external data sensor that carries out wireless communication with the external data communication device 3 via transceiver antennas 3a, 14a to thereby acquire information from the outside that cannot otherwise be acquired by the host vehicle.

For example, in the case of a data communication device installed in another vehicle traveling in the vicinity of the host vehicle, the external data communication device 3 carries out vehicle-to-vehicle communication between the host vehicle and the other vehicle, and, from among the various pieces of information held by the other vehicle, acquires information necessary for the host vehicle by a request from the on-board data communication device 14. In addition, for example, in the case of a data communication device provided in an infrastructure equipment, the external data communication device 3 carries out infrastructure communication between the host vehicle and the infrastructure equipment, and, from among the various pieces of information held by the infrastructure equipment, acquires information necessary for the host vehicle by a request from the on-board data communication device 14. Information acquired with the external data communication device 3 is output to the automatic driving control unit 4 via the on-board data communication device 14.

That is, for example, if there is insufficient information in the map data stored in the map data storage unit 2 or information that has been updated from the map data, the automatic driving control unit 4 can supplement the insufficient information or updated information, by means of communication with an external device with the external data communication device 3. It is also possible to acquire traffic information such as traffic congestion information and travel restriction information for the target travel route on which the host vehicle is scheduled to travel.

The map data storage unit 2 (map data) is composed of on-board memory that stores so-called electronic map data, in which map information is associated with position information indicated by latitude and longitude.

Here, GPS map data and high-precision three-dimensional map data (dynamic map) are stored in the map data storage unit 2. The GPS map data are used for normal route guidance. On the other hand, the high-precision three-dimensional map data have three-dimensional spatial information that is even more precise than GPS map data, a precision with which it is possible to recognize at least each lane of a road having a plurality of lanes. By using such high-precision map data, it is possible to set a target travel route, indicating in which lane, from among the plurality of lanes, the host vehicle would travel via automatic driving, and to set a stop position and target travel position in the vehicle width direction within one lane.

In addition, map information described in the electronic map data includes road information associated with each point. The road information is defined by nodes, and road links that connect the nodes. In addition, the map information described in the electronic map data includes information relating to targets (road signs, road markings, white road lines, road boundaries, stop lines, pedestrian crossings, etc.) provided on the road surface or shoulders of the host vehicle travel path. Here, in addition to position information for each target, the electronic map data may also store associated information other than position information, such as shape and dimensional information.

When the host vehicle position detected by the GPS 13 or the host vehicle position estimated by means of calculation is recognized as the host vehicle position information, the automatic driving control unit 4 makes a request to the map data storage unit 2 for the electronic map data around the host vehicle position based on the recognized host vehicle position information, to thereby acquire the necessary electronic map data. Then, the host vehicle position is set on the acquired electronic map data. Moreover, the automatic driving control unit 4 integrates the acquired electronic map data and information input from the on-board sensor 1, and the like (host vehicle information, host vehicle position information, host vehicle surroundings information, destination information, and the like) to generate the target travel route, a target vehicle speed profile (including acceleration profile and deceleration profile), and the like.

When the target travel route is generated, the automatic driving control unit 4 outputs a travel control command or a stop control command so that the vehicle travels along the target travel route, and calculates the required drive command value, braking command value, and steering angle command value. The various types of command values calculated by the automatic driving control unit 4 are output from the automatic driving control unit 4 to each actuator 51-53, and the host vehicle travels along the target travel route, with its vehicle speed and steering thereby controlled. Here, specifically, the automatic driving control unit 4 outputs the calculation result of the drive command value to a drive actuator 51, outputs the calculation result of the braking command value to a braking actuator 52, and outputs the calculation result of the steering angle command value to a steering angle actuator 53.

Moreover, the automatic driving control unit 4 compares the position information of targets stored in the electronic map data with the position information of the target acquired from the image data photographed with the camera 11 of the on-board sensor 1 installed in the host vehicle. Then, based on the results of the comparison, the host vehicle position set on the electronic map data is corrected (hereinafter referred to as "self-location correction"). This self-location correction is carried out by means of outputting a self-location correction execution request, which is periodically output. In addition, the host vehicle position set on the electronic map data is presented to the driver together with a map image via, for example, the HMI device 6.

The actuator 5 is a control actuator that carries out the vehicle speed control and the steering control of the host vehicle, and includes the drive actuator 51, the braking actuator 52, and the steering angle actuator 53.

The drive actuator 51 receives drive command values input from the automatic driving control unit 4 and controls the driving force that is output to the drive wheels. Examples of the drive actuator 51 that can be used include an engine in the case of an engine-powered vehicle, an engine and a motor-generator (power running) in the case of a hybrid vehicle, and a motor-generator (power running) in the case of an electric vehicle.

The braking actuator 52 receives drive command values input from the automatic driving control unit 4 and controls the braking force that is output to the drive wheels. Examples of the braking actuator 52 that can be used include a hydraulic booster, an electric booster, a brake fluid pressure actuator, a brake motor actuator, and a motor-generator (regeneration).

The steering angle actuator 53 receives steering angle command values input from the automatic driving control unit 4 and controls the steering angle of the steerable wheels. Examples of the steering angle actuator 53 that can be used include a steering motor, or the like, that is provided in a steering force transmission system of a steering system.

The HMI device 6 provides information to the driver and passengers such as where on the map the host vehicle is moving during the automatic driving. "HMI" is an acronym for "Human Machine Interface." The HMI device 6 is, for example, a HUD (Head-Up Display), a meter display, a navigation monitor (vehicle interior monitor), etc., one or more of which can be combined.

Then, the automatic driving control unit 4 according to the first embodiment has a position mode controller 40 (controller) that includes a CPU (Central Processing Unit), a storage medium, and the like, and that carries out position mode selection control for setting the target inter-vehicular distance from the host vehicle to a preceding vehicle traveling immediately in front of the host vehicle.

The control block configuration of the position mode controller 40 will be described below based on FIG. 2.

Figure 2:
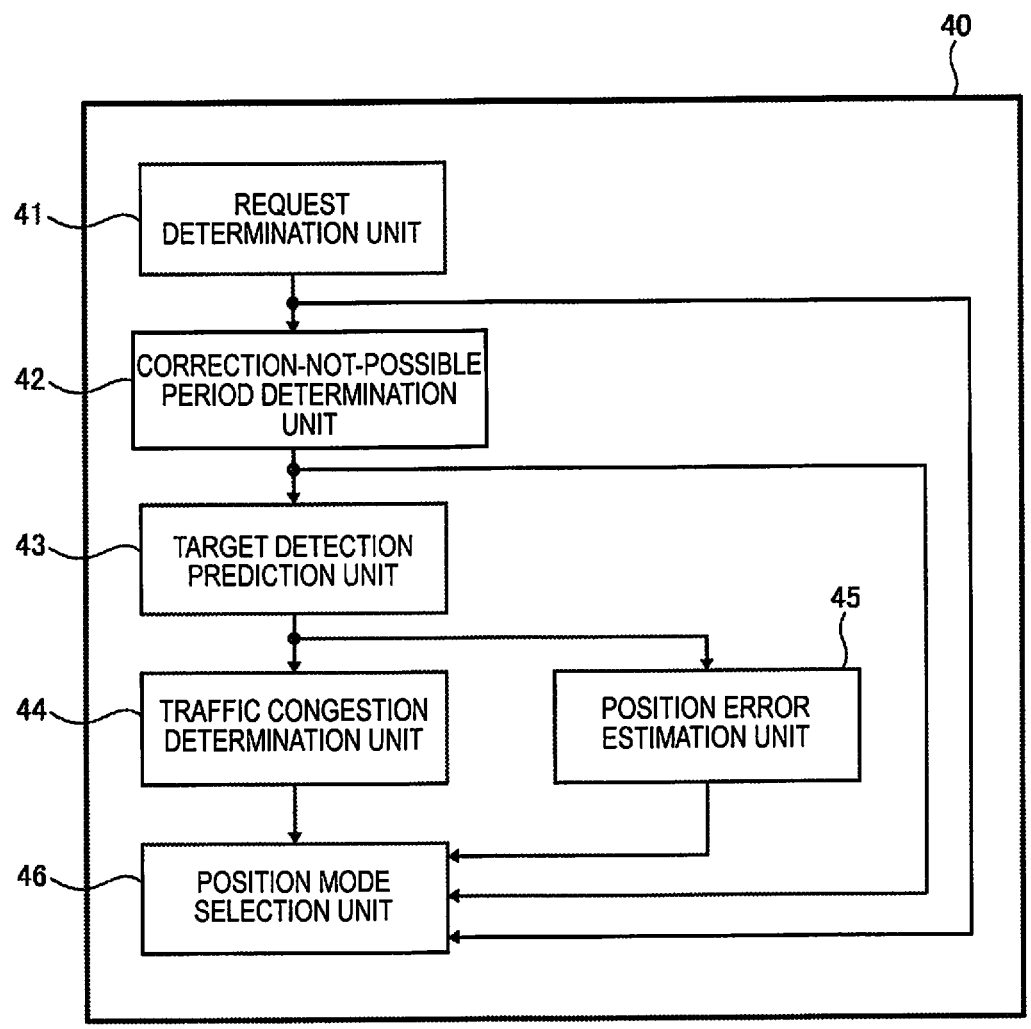
FIG. 2 is a control block diagram illustrating a position mode controller provided in an automatic driving control unit.

As shown in FIG. 2, the position mode controller 40 includes a request determination unit 41, a correction-not-possible period determination unit 42, a target detection prediction unit 43, a traffic congestion determination unit 44, a position error estimation unit 45, and a position mode selection unit (target inter-vehicular distance setting unit) 46.

Based on the presence or absence of a request to execute self-location correction output from the automatic driving control unit 4, the request determination unit 41 determines whether there is an execution request and outputs request determination information. The output request determination information is input to the correction-not-possible period determination unit 42 and the position mode selection unit 46. Here, if an execution request for self-location correction has been input, the request determination unit 41 sets a request flag to "1." In addition, after correction control based on the execution request for self-location correction has been started, if it is determined that the execution of the self-location correction has been completed, or it is determined that the execution of the self-location correction will not be completed within a prescribed period of time from the output of the execution request for self-location correction, the request determination unit 41 sets the request flag to "zero." Then, when this request flag is set to "1," the request determination unit 41 outputs request determination information that there is an execution request for self-location correction. On the other hand, when this request flag is set to "zero," the request determination unit 41 outputs a request determination information that there is no execution request for self-location correction.

When request determination information that "there is an execution request for self-location correction" is input from the request determination unit 41, the correction-not-possible period determination unit 42 compares the period during which self-location correction cannot be executed (hereinafter referred to as "correction-not-possible period") with a threshold period that has been set in advance. Then, it is determined whether the correction-not-possible period has continued for the threshold period or longer, and correction-not-possible period information is output. The output correction-not-possible period information is input to the target detection prediction unit 43 and the position mode selection unit 46. Here, when an execution request for self-location correction is input from the automatic driving control unit 4 in a state in which the correction-not-possible period is zero, the correction-not-possible period determination unit 42 starts counting time. This counted time becomes the "correction-not-possible period."

After the count is started, the correction-not-possible period is continuously counted until the execution of the self-location correction is completed, and is returned to zero after the execution of the self-location correction is completed. That is, the "correction-not-possible period" is the period from when an execution request for self-location correction occurs in a state in which the correction-not-possible period is zero, to when the execution of the self-location correction is completed. For this reason, even if an execution request for self-location correction occurs again during the counting of the correction-not-possible period, the correction-not-possible period continues to be counted until the execution of the self-location correction is completed.

When the correction-not-possible period information that the "correction-not-possible period has continued for a threshold period or longer" is input from the correction-not-possible period determination unit 42, the target detection prediction unit 43 determines whether a target, such as a road sign described in the electronic map data to be within a prescribed range in the vicinity of the host vehicle position, has been detected based on image data photographed with the camera 11 of the on-board sensor 1 during the execution of the self-location correction started based on the execution request, and outputs target detection information. That is, it is determined whether a target predicted to be photographable from the host vehicle based on the electronic map data has been actually photographed. The output target detection information is input to the traffic congestion determination unit 44 and the position error estimation unit 45.

Here, the target detection prediction unit 43 first acquires the electronic map data of a prescribed range around the host vehicle position set in the electronic map data. Subsequently, a target that can be detected by the on-board sensor 1 (camera 11) is predicted and specified from among the objects described in the acquired electronic map data. That is, the target specified here is a target that overlaps the photographable range (detection range) of the camera 11, which is determined based on the host vehicle position set on the electronic map data. When the target is specified, the image data actually photographed by the camera 11 is analyzed, and it is determined whether the specified target is included in the image data, that is, whether it was possible to photograph said target with the camera 11. When the specified target is included in the image data, the target detection prediction unit 43 outputs target detection information indicating that the target predicted as being detectable has actually been detected. On the other hand, when the specified target is not included in the image data, the target detection prediction unit 43 outputs target detection information indicating that the target could not be actually detected.

When the target detection information indicating that "target predicted as being detectable has been actually detected" is input from the target detection prediction unit 43, the traffic congestion determination unit 44 determines whether there is traffic congestion in the lane in which the host vehicle is traveling, and outputs traffic congestion information. The output traffic congestion information is input to the position mode selection unit 46. Here, when the determinations listed below are made, the traffic congestion determination unit 44 outputs traffic congestion information indicating that there is traffic congestion. On the other hand, if the determinations listed below cannot be made, traffic congestion information indicating that there is no traffic congestion is output.

A state in which the speed of the host vehicle is at or below a prescribed vehicle speed has continued for at least a prescribed preset period of time (hereinafter referred to as "first traffic congestion determination time").

A prescribed range or more of the photographed image (detection range) of the camera 11 of the on-board sensor 1 is blocked by a preceding vehicle traveling immediately in front of the host vehicle.

A state in which the inter-vehicular distance from the host vehicle to a preceding vehicle traveling immediately in front of the host vehicle has become a prescribed distance or less has continued for at least a prescribed preset period of time (hereinafter referred to as "second traffic congestion determination time").

Figure 3:
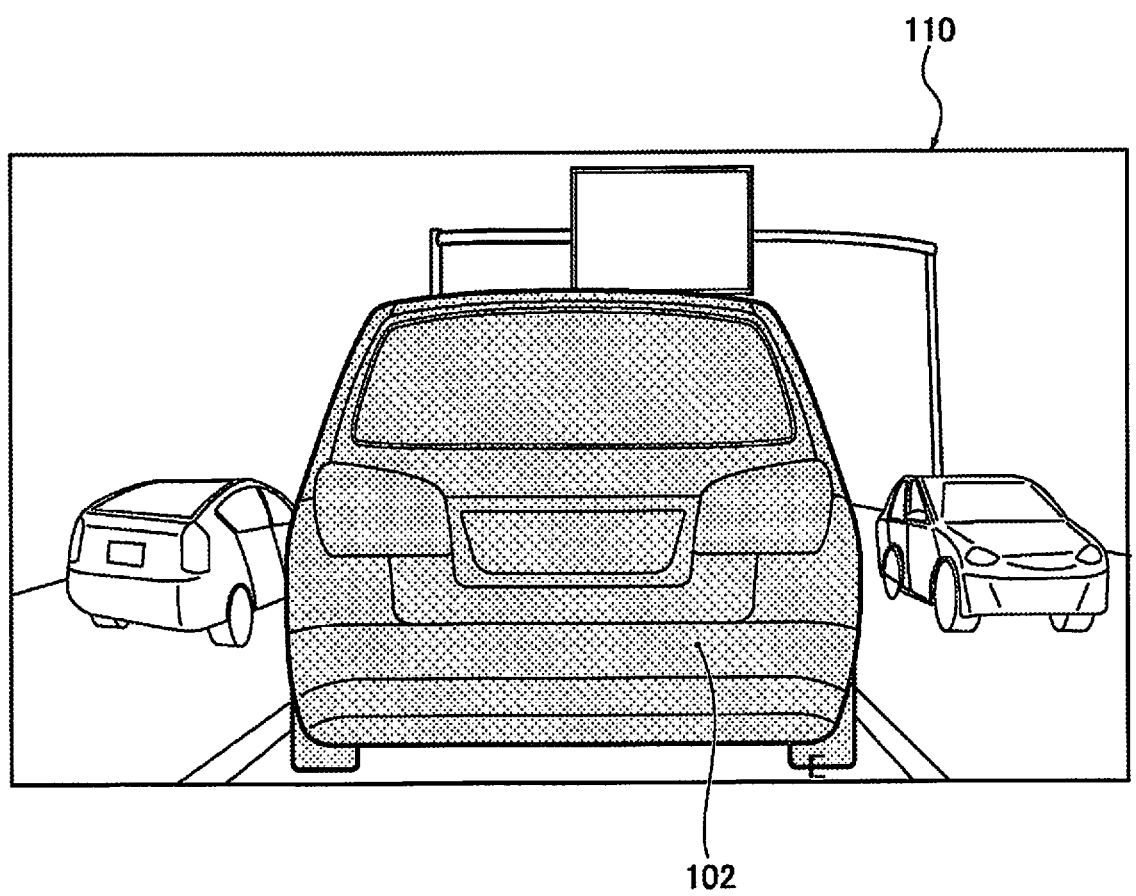
FIG. 3 is an explanatory view illustrating a photographic image, photographed with a front recognition camera.

It should be noted that "a prescribed range or more of the photographed image is blocked by a preceding vehicle" means a state in which, with respect to a photographed image area 110 shown in FIG. 3, the ratio occupied by the image area (area colored with the dots in FIG. 3) of a preceding vehicle 102 traveling immediately in front of the host vehicle is at or above a prescribed ratio.

When the target detection information indicating that "target predicted as being detectable could not be actually detected" is input from the target detection prediction unit 43, the position error estimation unit 45 determines whether a "long inter-vehicular distance mode" has already been selected as the position mode by the position mode selection unit 46 based on the information input from the position mode selection unit 46. Then, if it is determined that the "long inter-vehicular distance mode" has already been selected as the position mode, it is determined whether an estimated position error between the true host vehicle position and the host vehicle position set on the electronic map data is greater than or equal to a preset threshold error, and the estimated position error is output. The output mode determination information and the estimated error information are input to the position mode selection unit 46.

Here, the position error estimation unit 45 predicts the estimated position error in accordance with the length of the correction-not-possible period. That is, in general, the estimated position error increases as the correction-not-possible period becomes longer. Therefore, when the correction-not-possible period is less than a prescribed error determination period set in advance, the position error estimation unit 45 outputs estimated error information that the estimated position error is less than the threshold error. On the other hand, if the correction-not-possible period is greater than or equal to the prescribed error determination period set in advance, it is determined that greater than an assumed amount of error has occurred between the true host vehicle position and the host vehicle position set on the electronic map data, and estimated error information that the estimated position error is greater than or equal to the threshold error is output. When it is determined that the "long inter-vehicular distance mode" has not been selected as the position mode set by the position mode selection unit 46, the position error estimation unit 45 also outputs the estimated error information that the estimated position error is less than the threshold error.

The position mode selection unit 46 selects the position mode based on the request determination information from the request determination unit 41, the correction-not-possible period information from the correction-not-possible period determination unit 42, the traffic congestion information from the traffic congestion determination unit 44, and the estimated error information from the position error estimation unit 45, and sets, based on the selected position mode, a target inter-vehicular distance from the host vehicle to a preceding vehicle traveling immediately in front of the host vehicle, and a target lane in which the host vehicle is caused to travel. The automatic driving control unit 4 calculates the required drive command value, braking command value, and steering angle command value, in order to realize the set target inter-vehicular distance and target lane. The various types of command values calculated by the automatic driving control unit 4 are output from the automatic driving control unit 4 to each of the actuators 51-53, and vehicle speed control and steering control are carried out such that the inter-vehicular distance and the travel lane match the targets. The selected position mode maintains the current selected state until a new position mode is selected.

Here, when the information listed below is input, the position mode selection unit 46 selects "normal mode" as the position mode.

When request determination information that "there is no execution request for self-location correction" is input from the request determination unit 41.

When correction-not-possible period information that "correction-not-possible period has not continued for a threshold period or longer" is input from the correction-not-possible period determination unit 42.

When traffic congestion information that "there is no traffic congestion in the lane in which the host vehicle is traveling" is input from the traffic congestion determination unit 44.

In addition, when the information listed below is input, the position mode selection unit 46 selects "long inter-vehicular distance mode" as the position mode.

When traffic congestion information that "there is traffic congestion in the lane in which the host vehicle is traveling" is input from the traffic congestion determination unit 44.

When estimated error information that "estimated position error is less than the threshold error" is input from the position error estimation unit 45.

Additionally, when the information below is input, the position mode selection unit 46 selects "position lost mode" as the position mode.

When estimated error information that "estimated position error is greater than or equal to the threshold error" is input from the position error estimation unit 45.

Then, when the "normal mode" is selected as the position mode, the target lane in which to the host vehicle is to travel is set to the lane in which the host vehicle is traveling (host vehicle lane), and the target inter-vehicular distance is set to the first target inter-vehicular distance, which is set in advance based on the relative vehicle speed difference with the preceding vehicle, the weather, the road type, and the like. When the "long inter-vehicular distance mode" is selected as the position mode, the target lane is set to the host vehicle lane, and the target inter-vehicular distance is set to the second target inter-vehicular distance, which is longer than the first target inter-vehicular distance. Here, the second target inter-vehicular distance is set as 1.5 times the first target inter-vehicular distance.

When the "position lost mode" is selected as the position mode, the target lane is set to the lane farthest on the left (leftmost lane) on the road on which the host vehicle is traveling, and the target inter-vehicular distance is set to the first target inter-vehicular distance. Here, in the case of left-hand traffic, targets such as road signs are placed on the left side of the road. In addition, there is a high probability that a highway exit or a merging lane is provided on the left side of the road, and that a white road line extending in a direction different from the lanes is present. Moreover, by moving to the leftmost lane, it becomes possible to prepare to exit from the nearest highway exit ahead onto a general road. Therefore, when the "position lost mode" is selected, it becomes easier to detect targets by setting the target lane to the leftmost lane.

The configuration of a position mode selection control process, which is executed by the position mode controller 40 according to the first embodiment, will be described below based on the flowchart of the position mode selection control shown in FIG. 4. This position mode selection control is, in principle, repeatedly executed until the host vehicle leaves the departure point and arrives at the destination.

In Step S1, it is determined whether there is an execution request for self-location correction. If YES (execution request present), the process proceeds to Step S2. If NO (execution request absent), the process proceeds to Step S7. Here, the presence or absence of the execution request for self-location correction is determined based on an input of the execution request for self-location correction, or on a request flag that is set based on completion of the execution of the self-location correction, or the like. Step S1 corresponds to the request determination unit 41.

In Step S2, following the determination that an execution request for self-location correction is present in Step S1, it is determined whether the correction-not-possible period, in which self-location correction cannot be executed, is longer than or equal to a preset threshold period. If YES (correction-not-possible period≥threshold period), the process proceeds to Step S3. If NO (correction-not-possible period<threshold period), the process proceeds to Step S7. Step S2 corresponds to the correction-not-possible period determination unit 42.

In Step S3, following the determination of correction-not-possible period≥threshold period in Step S2, it is determined whether an object predicted to be detectable by the on-board sensor 1 based on the electronic map data could actually be detected based on image data photographed with the camera 11. If YES (successful detection of predicted target), the process proceeds to Step S4. If NO (unsuccessful detection of predicted target), the process proceeds to Step S5. Step S3 corresponds to the target detection prediction unit 43.

In Step S4, following the determination of successful detection of the predicted target in Step S3, it is determined whether there is traffic congestion in the lane in which the host vehicle is traveling. If YES (traffic congestion present), the process proceeds to Step S8. In NO (no traffic congestion present), the process proceeds to Step S7. Here, the process to determine whether there is traffic congestion is carried out based on a traffic congestion determination control flowchart, described further below. Step S4 corresponds to the traffic congestion determination unit 44.

In Step S5, following the determination of an unsuccessful detection of predicted target in Step S3, it is determined whether the "long inter-vehicular distance mode" has been selected as the currently selected position mode. If YES (position mode=long inter-vehicular distance mode), the process proceeds to Step S6. If NO (position mode=normal mode or position lost mode), the process proceeds to Step S8.

In Step S6, following the determination of position mode=long inter-vehicular distance mode in Step S5, it is determined whether the estimated position error between the true host vehicle position and the host vehicle position set on the electronic map data is greater than or equal to a preset threshold error. If YES (estimated position error≥threshold error), the process proceeds to Step S9. If NO (estimated position error<threshold error), the process proceeds to Step S8. Step S5 and Step S6 correspond to the position error estimation unit 45.

In Step S7, following the determination that an execution request for self-location correction is absent in Step S1, the determination of correction-not-possible period<threshold period in Step S2, or the determination that there is no traffic congestion in Step S4, the "normal mode" is selected as the position mode, and the process proceeds to RETURN. The target lane is thereby set to the host vehicle lane, and the host vehicle continues to travel in the lane in which the host vehicle is already traveling. In addition, the target inter-vehicular distance is set to the first target inter-vehicular distance set in advance based on the relative vehicle speed difference with the preceding vehicle, and the like. The situation of "there is no execution request for self-location correction" means that it is not necessary to execute the self-location correction. In addition, the situation of "correction-not-possible period<threshold period" means that the elapsed time after the time that the self-location correction was carried out is short, and the estimated position error is small, so that it is not necessary to proactively change the target inter-vehicular distance or the target lane. Additionally, the situation of "there is no traffic congestion" means that the inter-vehicular distance between the host vehicle and the preceding vehicle can be appropriately maintained, and that it is not likely for the preceding vehicle to interfere with target detection.

In Step S8, following the determination that there is traffic congestion in Step S4, the determination of position mode=normal mode or position lost mode in Step S5, or the determination of estimated position error<threshold error in Step S6, the "long inter-vehicular distance mode" is selected as the position mode, and the process proceeds to RETURN. Thus, the lane in which the host vehicle is currently traveling is maintained as the target lane. In addition, the target inter-vehicular distance is set to the second target inter-vehicular distance, which is longer than the first target inter-vehicular distance. The situation of "there is traffic congestion" means that the inter-vehicular distance between the host vehicle and the preceding vehicle has become short, and that it is likely that the preceding vehicle will interfere with target detection. Additionally, the situation of "position mode=normal mode or position lost mode" and "estimated position error<threshold error" means that there is room for increasing chances of detecting a target by increasing the inter-vehicular distance.

In Step S9, following the determination of estimated position error≥threshold error in Step S6, the "position lost mode" is selected as the position mode, and the process proceeds to RETURN. The target lane is thereby set to the leftmost lane, and an automatic lane change is carried out if necessary. In addition, the target inter-vehicular distance is set to the first target inter-vehicular distance. The situation of "estimated position error≥threshold error" means that the estimated position error is large and that a self-location correction is necessary, so that it is desired to make it easier to detect a target described in the electronic map data. Steps S7 to S9 correspond to the position mode selection unit 46.

The configuration of a traffic congestion determination control process, which is executed by the traffic congestion determination unit 44 according to the first embodiment, will be described below based on the flowchart of the traffic congestion determination control shown in FIG. 5.

In Step S11, it is determined whether the host vehicle is in the D range and the vehicle speed is less than or equal to a prescribed vehicle speed (for example, 10 km/h). If YES (vehicle speed≤prescribed vehicle speed), the process proceeds to Step S12. If NO (vehicle speed>prescribed vehicle speed), the process proceeds to Step S14. The vehicle speed is detected by a vehicle speed sensor installed in the host vehicle. In addition, situations in which the vehicle speed is less than or equal to a prescribed vehicle speed include both when the vehicle is traveling and when the vehicle speed becomes zero and the vehicle stops.

In S12, following the determination of vehicle speed≤prescribed vehicle speed in Step S11, a first timer count, which is the elapsed time since the vehicle speed has become less than or equal to the prescribed vehicle speed, is carried out, and the process proceeds to Step S13.

In Step S13, following the counting by the first timer in Step S12, it is determined whether the count of the first timer is longer than or equal to a preset first traffic congestion determination time. If YES (first timer≥first traffic congestion determination time), it is determined that the state in which the speed of the host vehicle has become the prescribed vehicle speed or less has continued for the first traffic congestion determination time or more, and the process proceeds to Step S18. If NO (first timer<first traffic congestion determination time), it is determined that the state in which the speed of the host vehicle has become the prescribed vehicle speed or less has not continued for the first traffic congestion determination time or more, and the process returns to Step S11.

In Step S14, following the determination of vehicle speed>prescribed vehicle speed in Step S11, it is determined whether a prescribed range or more of the photographed image (detection range) of the camera 11 of the on-board sensor 1 is being blocked by a preceding vehicle traveling immediately in front of the host vehicle. If YES (prescribed range or more is being blocked), the process proceeds to Step S18. If NO (prescribed range or more is not being blocked), the process proceeds to Step S15. Here, the determination of whether a prescribed range or more of the photographed image of the camera 11 is being blocked by a preceding vehicle is made based on the ratio of the area of the image of the preceding vehicle relative to the area of the photographed image. That is, if the image area of the preceding vehicle occupying the area of the photographed image is greater than or equal to a prescribed ratio, it is determined that a "prescribed range or more of the photographed image is being blocked by the preceding vehicle," and if the image area of the preceding vehicle occupying the area of the photographed image is less than the prescribed ratio, it is determined that a "prescribed range or more of the photographed image is not being blocked by the preceding vehicle."

In Step S15, following the determination that a prescribed range or more of the photographed image (detection range) of the camera 11 is not being blocked by the preceding vehicle in Step S14, it is determined whether the actual inter-vehicular distance from the host vehicle to the preceding vehicle traveling immediately in front of the host vehicle is less than or equal to a prescribed distance. If YES (inter-vehicular distance≤prescribed distance), the process proceeds to Step S16. If NO (inter-vehicular distance>prescribed distance), the process proceeds to Step S19. Here, the inter-vehicular distance is detected with the radar 12.

In Step S16, following the determination of inter-vehicular distance≤prescribed distance in Step S15, a second timer, which is the elapsed time since the inter-vehicular distance in front of the host vehicle has become less than or equal to the prescribed distance, is carried out, and the process proceeds to Step S17.

In Step S17, following the counting by the second timer in Step S16, it is determined whether the count of the second timer is longer than or equal to a preset second traffic congestion determination time. If YES (second timer≥second traffic congestion determination time), it is determined that the state in which the inter-vehicular distance from the host vehicle to the preceding vehicle has become the prescribed distance or less has continued for the second traffic congestion determination time or more, and the process proceeds to Step S18. If NO (second timer<second traffic congestion determination time), it is determined that the state in which the inter-vehicular distance from the host vehicle to the preceding vehicle has become the prescribed distance or less has not continued for the second traffic congestion determination time or more, and the process returns to Step S15.

In Step S18, following the determination of first timer≥first traffic congestion determination time in Step S13, the determination that a prescribed range or more of the photographed image (detection range) of the camera 11 is being blocked by the preceding vehicle in Step S14, or the determination of second timer≥second traffic congestion determination time in Step S17, it is determined that there is traffic congestion in the lane in which the host vehicle is traveling, and the process proceeds to END. The traffic congestion determination unit 44 thereby outputs traffic congestion information indicating that there is traffic congestion.

In Step S19, following the determination of inter-vehicular distance≥prescribed distance in Step S15, it is determined that there is no traffic congestion in the lane in which the host vehicle is traveling, and the process proceeds to END. The traffic congestion determination unit 44 thereby outputs traffic congestion information indicating that there is no traffic congestion.

Changes in the target detection range due to differences in the inter-vehicular distance from the host vehicle to the preceding vehicle and the problems thereof will be described below based on FIGS. 6A to 6E. Here, the target shall be a road sign 103 installed at the left end of the road, and the on-board sensor 1 shall be the camera 11 (front recognition camera) that is installed at the front of a host vehicle 101 and that photographs in the direction ahead of the host vehicle.

In addition, in the drawings, a range 111 that can be photographed with the camera 11 is indicated by coarse diagonal lines, and a photographing range (range in which the road sign 103 can be photographed) 112 that is not blocked by a preceding vehicle 102 is indicated by fine diagonal lines.

Figure 6A:
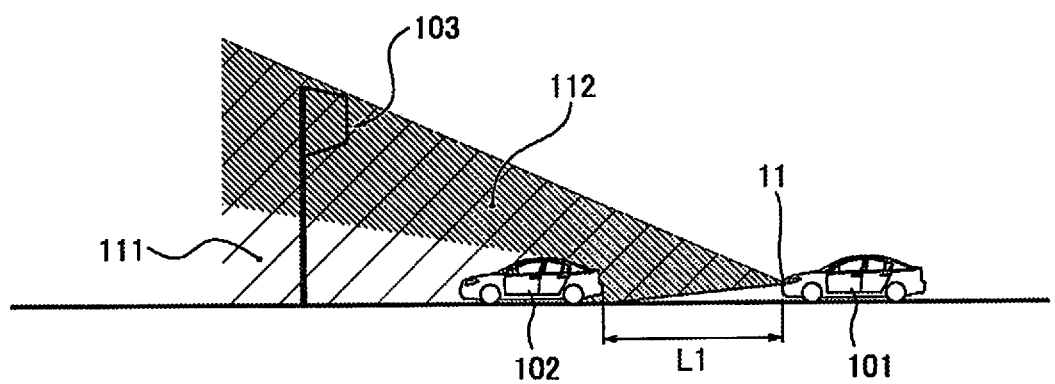
FIG. 6A is an explanatory view illustrating a photographable range when a preceding vehicle is an ordinary passenger car and the inter-vehicular distance is a first target inter-vehicular distance.

If the preceding vehicle 102 is an ordinary passenger car, a small passenger car, a light vehicle, or the like, having a relatively low vehicle height, as shown in FIG. 6A, even if following travel is carried out with the target inter-vehicular distance set to a first target inter-vehicular distance L1, the ratio of the photographed image (detection range) of the camera 11 blocked by the preceding vehicle 102 is low. Therefore, it is possible to secure the photographing range 112 that is not blocked by the preceding vehicle 102, and thus to photograph the target road sign 103 with the camera 11 and detect the same based on image data. As a result, it becomes possible to execute a self-location correction.

Figure 6B:
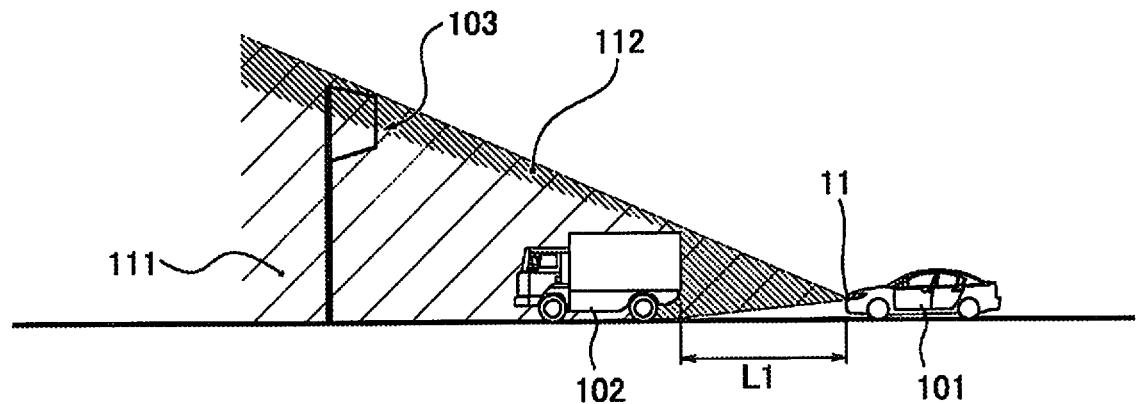
FIG. 6B is a first explanatory view illustrating the photographable range when the preceding vehicle is a large truck and the inter-vehicular distance is the first target inter-vehicular distance.
Figure 6C:
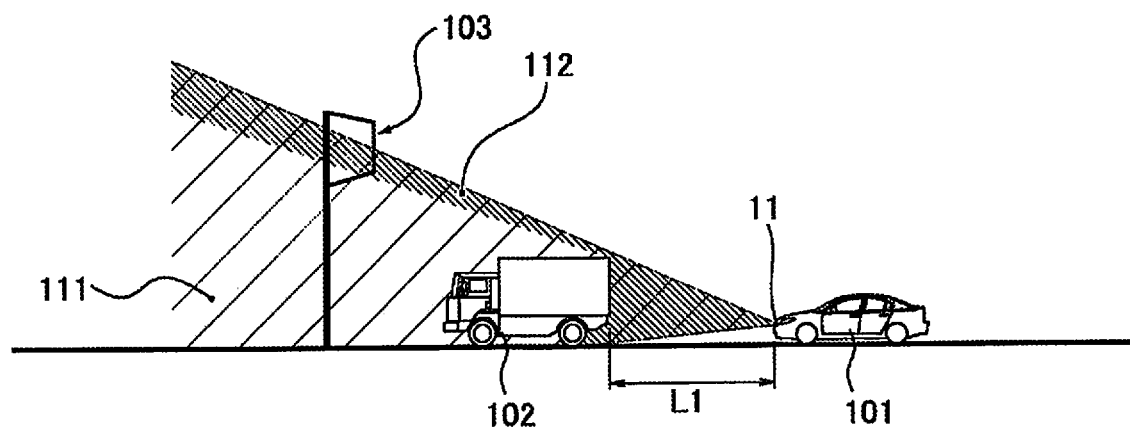
FIG. 6C is a second explanatory view illustrating the photographable range when the preceding vehicle is a large truck and the inter-vehicular distance is the first target inter-vehicular distance.
Figure 6D:
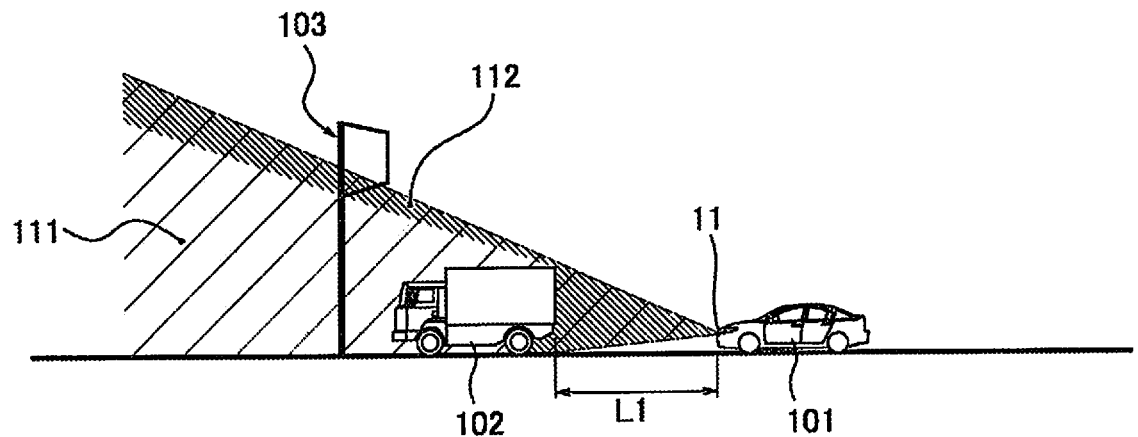
FIG. 6D is a third explanatory view illustrating the photographable range when the preceding vehicle is a large truck and the inter-vehicular distance is the first target inter-vehicular distance.

On the other hand, if the preceding vehicle 102 is a large vehicle, such as a truck or a bus, having a relatively high vehicle height, as shown in FIG. 6B, if following travel is carried out with the target inter-vehicular distance set to the first target inter-vehicular distance L1, the ratio of the photographed image (detection range) of the camera 11 blocked by the preceding vehicle 102 is high. Therefore, it is difficult to sufficiently secure the photographing range 112 that is not blocked by the preceding vehicle 102, and the target road sign 103 cannot be appropriately photographed with the camera 11. Additionally, as shown in FIGS. 6C and 6D, even if the host vehicle 101 and the preceding vehicle 102 both travel and approach the road sign 103, the road sign 103 enters only a portion of the photographing range 112 that is not blocked by the preceding vehicle 102. Therefore, it becomes extremely difficult to detect the road sign 103 based on the image data photographed with the camera 11. Therefore, there is the risk that the probability of self-location correction will be reduced.

Figure 6E:
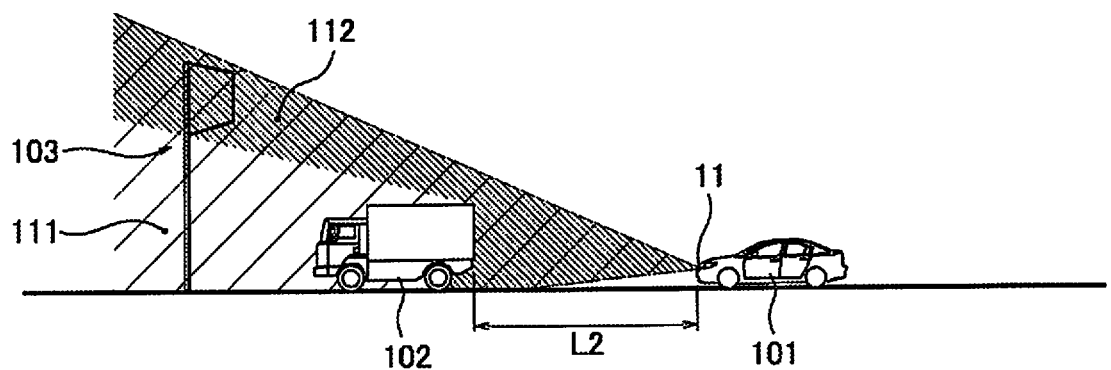
FIG. 6E is an explanatory view illustrating the photographable range when the preceding vehicle is a large truck and the inter-vehicular distance is a second target inter-vehicular distance.

In contrast, let us consider a case in which, even if the preceding vehicle 102 is a large vehicle having a relatively high vehicle height, as shown in FIG. 6E, following travel is carried out with the target inter-vehicular distance set to a second target inter-vehicular distance L2 that is longer than the first target inter-vehicular distance L1 (for example, 1.5 times the first target inter-vehicular distance L1). At this time, since the host vehicle 101 is separated from the preceding vehicle 102, an angle (angle of view) created by two lines drawn from both ends of the preceding vehicle 102 to the center of the camera 11 becomes small. As a result, the ratio of the photographed image (detection range) of the camera 11 that is blocked by the preceding vehicle 102 becomes small. Thus, even if the preceding vehicle 102 is a large vehicle, it is possible to secure the photographing range 112 that is not blocked by the preceding vehicle 102 by increasing the inter-vehicular distance, and thus to photograph the target road sign 103 with the camera 11 and detect this road sign 103 based on image data. As a result, it becomes possible to execute a self-location correction.

An action to increase the probability of target detection in the driving assist method and the driving assist device according to the first embodiment, in a scenario in which there is traffic congestion in the lane in which the host vehicle is traveling, will be described below based on FIG. 7.

Figure 4:
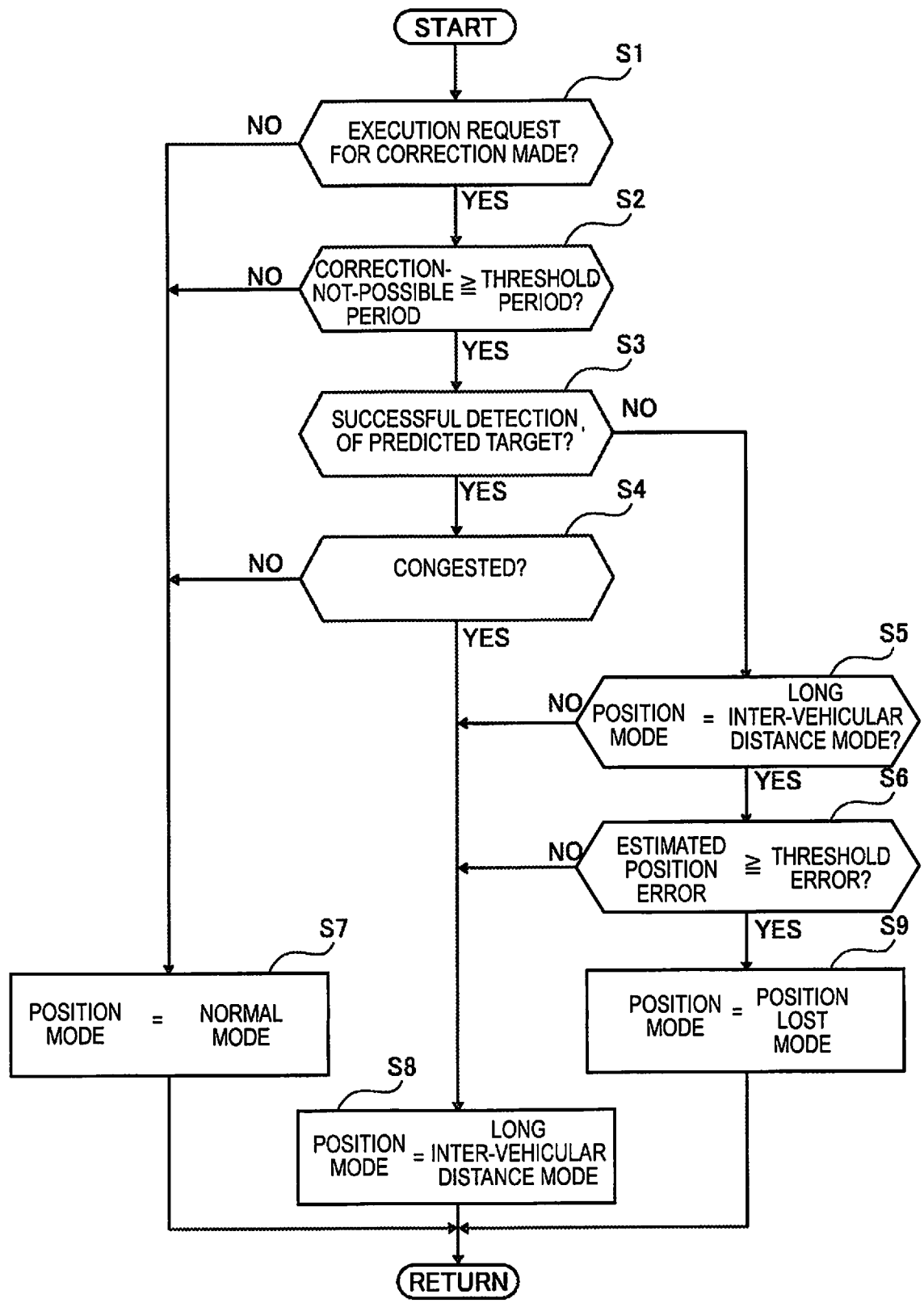
FIG. 4 is a flowchart illustrating the process flow of a position mode selection control executed in the position mode controller according to a first embodiment.

That is, when the host vehicle 101, traveling by means of automatic driving, is following the preceding vehicle 102 with an inter-vehicular distance set to the first target inter-vehicular distance L1, if an execution request for self-location correction is input at time t1, an affirmative determination is made in Step S1 shown in FIG. 4, and the process proceeds to Step S2. Here, if the elapsed time since the completion of the previous execution of the self-location correction is greater than or equal to a threshold period, the determination of Step S2 is affirmative, and the process proceeds to Step S3.

Then, during the execution of the self-location correction, it is determined whether a target, such as a road sign predicted to be photographable from the host vehicle 101 based on the electronic map data, could actually be detected based on the image data photographed with the camera 11. If the target detection succeeds, an affirmative determination is made in Step S3, the process proceeds to Step S4, and it is determined whether there is traffic congestion in a host vehicle lane 104, which is the lane in which the host vehicle 101 is traveling.

Figure 5:
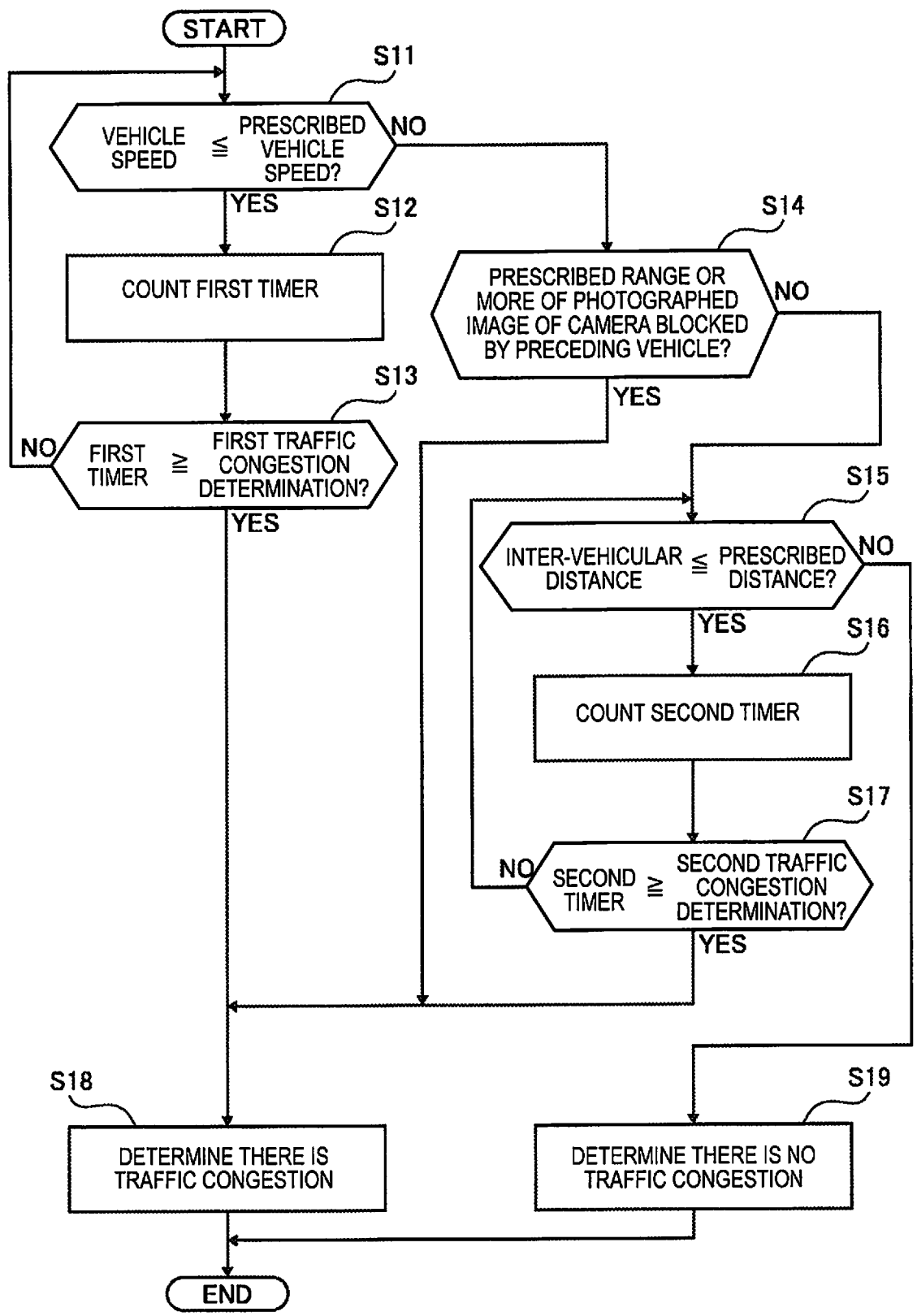
FIG. 5 is a flowchart illustrating the process flow of a traffic congestion determination control executed in a traffic congestion determination unit according to the first embodiment.

Here, if a state in which the speed of the host vehicle 101 has become a prescribed vehicle speed or less has continued for the preset first traffic congestion determination time or more, the process progresses from Step S11 to Step S12, Step S13, and Step S18 in that order in the flowchart shown in FIG. 5, and it is determined that the host vehicle lane 104 is congested. As a result, an affirmative determination is made in Step S4, the process proceeds to Step S8, and the "long inter-vehicular distance mode" is selected as the position mode. That is, the target lane is set to the lane in which the host vehicle 101 is traveling (host vehicle lane 104), and the target inter-vehicular distance is set to the second target inter-vehicular distance L2, which is longer than the first target inter-vehicular distance L1.

During following travel with the target inter-vehicular distance set to the first target inter-vehicular distance L1, even if the vehicle speed is high, if a prescribed range or more of the photographed image (detection range) of the camera 11 is being blocked by the preceding vehicle 102, the process progresses from Step S11 to Step S14, and Step S18 in that order in the flowchart shown in FIG. 5, and it is determined that the host vehicle lane 104 is congested. Then, the "long inter-vehicular distance mode" is selected as the position mode, and the target inter-vehicular distance is set to the second target inter-vehicular distance L2.

In addition, during following travel with the target inter-vehicular distance set to the first target inter-vehicular distance L1, if the actual inter-vehicular distance becomes less than or equal to the prescribed distance and that state continues for the second target inter-vehicular distance L2 or longer, the process progresses from Step S11 to Step S14, Step S15, Step S16, Step S17, and Step S18 in that order in the flowchart shown in FIG. 5, and it is determined that the host vehicle lane 104 is congested. Then, the "long inter-vehicular distance mode" is selected as the position mode, and the target inter-vehicular distance is set to the second target inter-vehicular distance L2.

Moreover, during the execution of the self-location correction, if a target, such as a road sign, cannot be detected based on the image data photographed with the camera 11 of the on-board sensor 1, a negative determination is made in Step S3, and the process proceeds to Step S5. Then, it is determined whether the "long inter-vehicular distance mode" has already been selected as the position mode.

Figure 7:
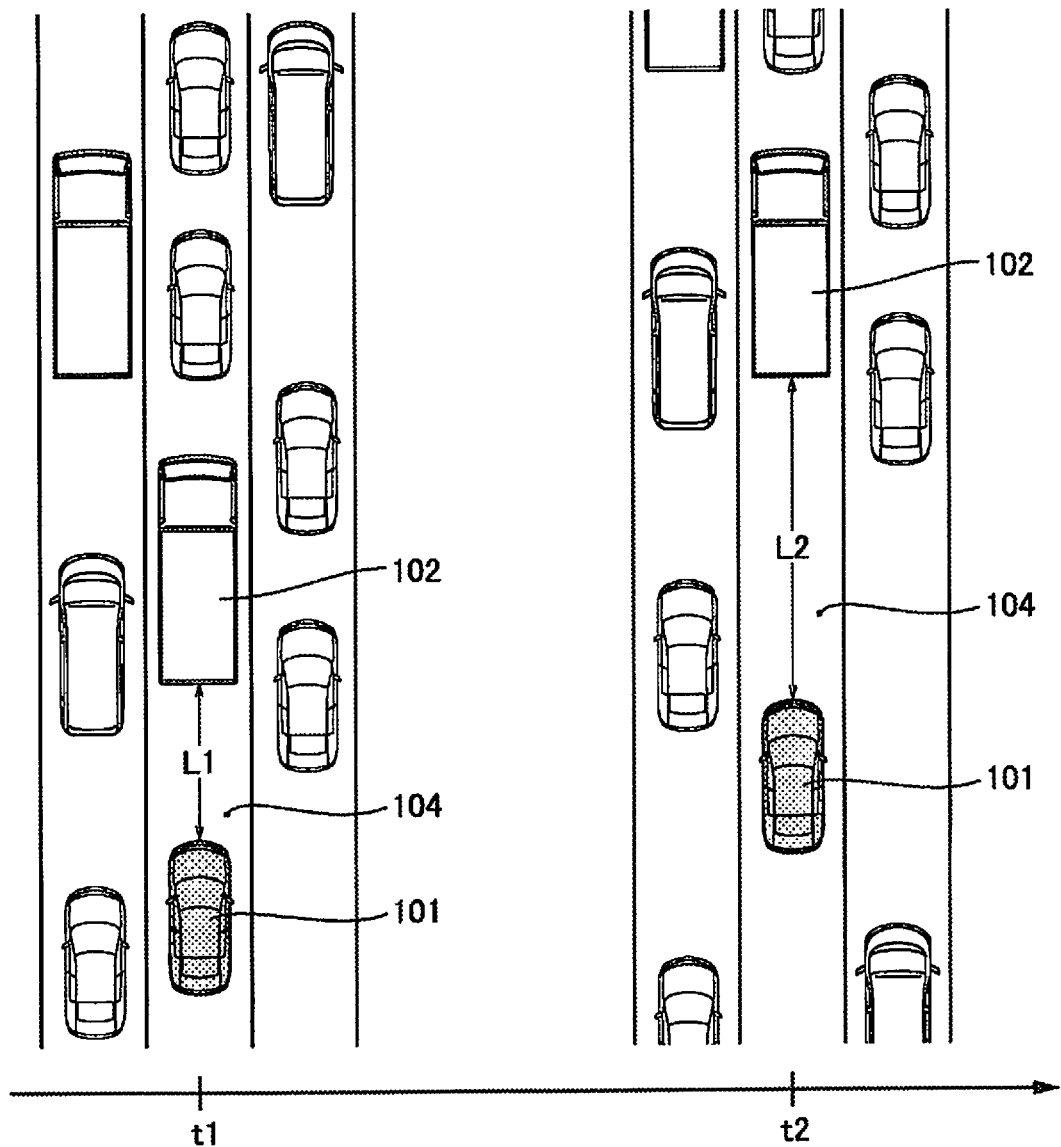
FIG. 7 is an explanatory view explaining the action of increasing the probability of target detection in a scenario in which a request to correct a self-location is made during following travel in a traffic jam.

In the scenario shown in FIG. 7, since the "normal mode" in which the target inter-vehicular distance is set to the first target inter-vehicular distance L1 is selected at time t1, a negative determination is made in Step S5, the process proceeds to Step S8, and the "long inter-vehicular distance mode" is selected as the position mode. Then, the target inter-vehicular distance is set to the second target inter-vehicular distance L2, which is longer than the first target inter-vehicular distance L1, while the host vehicle lane 104 is maintained as the target lane.

On the other hand, when a negative determination is made in Step S3 and the process proceeds to Step S5, if the "long inter-vehicular distance mode" has already been selected as the position mode, the process proceeds from Step S5 to Step S6. Then, it is determined whether the estimated position error between the true host vehicle position and the host vehicle position set on the electronic map data is greater than or equal to a preset threshold error. If the estimated position error is small and is less than the threshold error, a negative determination is made in Step S6, the process proceeds to Step S8, and the "long inter-vehicular distance mode" is selected as the position mode. In this case, since the "long inter-vehicular distance mode" is already selected as the position mode, the "long inter-vehicular distance mode" is maintained as the position mode. In other words, the target inter-vehicular distance is maintained at the second target inter-vehicular distance L2, which is longer than the first target inter-vehicular distance L1, while the host vehicle lane 104 is maintained as the target lane.

Then, when the target inter-vehicular distance is set to the second target inter-vehicular distance L2, the actual inter-vehicular distance is increased by carrying out a deceleration control, delaying the start timing to be later than the start timing of the preceding vehicle 102, stopping earlier than the stop timing of the preceding vehicle 102, or the like. Thus, the inter-vehicular distance from the host vehicle 101 to the preceding vehicle 102 matches the second target inter-vehicular distance L2 at time t2. Then, as shown in FIG. 6E, even if the preceding vehicle 102 is a large vehicle, it is possible to secure the photographing range 112 that is not blocked by the preceding vehicle 102 by increasing the inter-vehicular distance, and thus to increase the probability of detecting the object. As a result, it is possible to reduce the probability of missing an opportunity for the self-location correction.

In contrast, when the host vehicle 101, traveling by means of automatic driving, is following the preceding vehicle 102 with an inter-vehicular distance set to the first target inter-vehicular distance L1, if there is no execution request for self-location correction, a negative determination is made in Step S1, and the process proceeds to Step S7. That is, the "normal mode" is selected as the position mode, and the target inter-vehicular distance is set to the first target inter-vehicular distance L1, which is determined based on a prescribed condition, such as the vehicle speed, while the host vehicle lane 104 is maintained as the target lane.

In addition, even if the correction-not-possible period is less than the threshold period, or if it is determined that there is no traffic congestion in the host vehicle lane 104, in either case, a negative determination is made in Step S2 and the process proceeds to Step S7, or a negative determination is made in Step S4 and the process proceeds to Step S7. Then, "normal mode" is selected as the position mode, and the target inter-vehicular distance is set to the first target inter-vehicular distance L1, which is determined based on a prescribed condition, such as the vehicle speed, while the host vehicle lane 104 is maintained as the target lane.

As a result, in a scenario in which an execution of the self-location correction is not necessary, or a scenario in which there is little concern that the inter-vehicular distance would decrease, it is possible to prevent the inter-vehicular distance from being set unnecessarily long, and to travel at an appropriate inter-vehicular distance.

In addition, in the first embodiment, under the condition that the correction-not-possible period has continued for a preset threshold period or longer, the "long inter-vehicular distance mode" is selected as the position mode. That is, when the self-location correction is being executed at an appropriate timing, it is possible to prevent the "long inter-vehicular distance mode" from being selected as the position mode. Therefore, it is possible to prevent the target inter-vehicular distance from being set unnecessarily long and to suppress a reduction in the chance for correction while suppressing changes in the inter-vehicular distance.

In addition, in the first embodiment, when there is traffic congestion in the host vehicle lane 104 in which the host vehicle 101 is traveling, the "long inter-vehicular distance mode" is selected as the position mode even if the target (road sign 103, etc.) could be detected based on image data of the camera 11. As a result, it is possible to set the target inter-vehicular distance to the relatively long second target inter-vehicular distance, when the inter-vehicular distance becomes short due to traffic congestion and there is a high probability of missing a chance to execute the self-location correction. Therefore, it is possible to reduce the probability of missing an opportunity for correction.

Then, in the first embodiment, a determination that there is traffic congestion in the host vehicle lane 104 is made when a state in which the speed of the host vehicle 101 has become the prescribed vehicle speed or less has continued for the first traffic congestion determination time or more. Therefore, it becomes possible to easily determine that there is traffic congestion, and to set the target inter-vehicular distance to the second target inter-vehicular distance L2 at an appropriate timing. Then, it is possible to create a suitable situation in which the execution of a self-location correction becomes possible.

Additionally, if it is determined that there is traffic congestion in the host vehicle lane 104 due to the fact that at least a prescribed range of the photographed range (detection range) 110 of the camera 11 is being blocked by the preceding vehicle 102, it is possible to set the target inter-vehicular distance to the second target inter-vehicular distance L2, while recognizing a situation in which it is difficult to detect the target (road sign 103, etc.) based on the image data of the camera 11. Therefore, it is possible to reliably create a situation in which the execution of the self-location correction becomes possible when the execution of the self-location correction is required.

In addition, if it is determined that there is traffic congestion in the host vehicle lane 104 based on the fact that a situation in which the actual inter-vehicular distance from the host vehicle 101 to the preceding vehicle 102 has become a prescribed distance or less has continued for the second traffic congestion determination time or more, it becomes possible to easily determine that there is traffic congestion. Then, it is possible to set the target inter-vehicular distance to the second target inter-vehicular distance L2 at an appropriate timing, and to appropriately create a situation in which the execution of the self-location correction becomes possible.

An action to increase the probability of target detection in the driving assist method and the driving assist device according to the first embodiment, in a scenario in which the estimated position error exceeds the threshold error, will be described below based on FIG. 8.

That is, if there is an execution request for a self-location correction, and the correction-not-possible period is greater than or equal to a threshold period, and an object (road sign 103 in FIG. 8) stored in the electronic map data cannot be detected, the process progresses from Step S1 to Step S2, Step S3, and Step S5 in that order, and it is determined whether the "long inter-vehicular distance mode" is selected as the position mode. Here, if the "long inter-vehicular distance mode" has already been selected as the position mode, and the target inter-vehicular distance has been set to the second target inter-vehicular distance L2, the process proceeds to Step S6, and it is determined whether the estimated position error between the true host vehicle position and the host vehicle position set on the electronic map data is greater than or equal to the preset threshold error.

Figure 8:
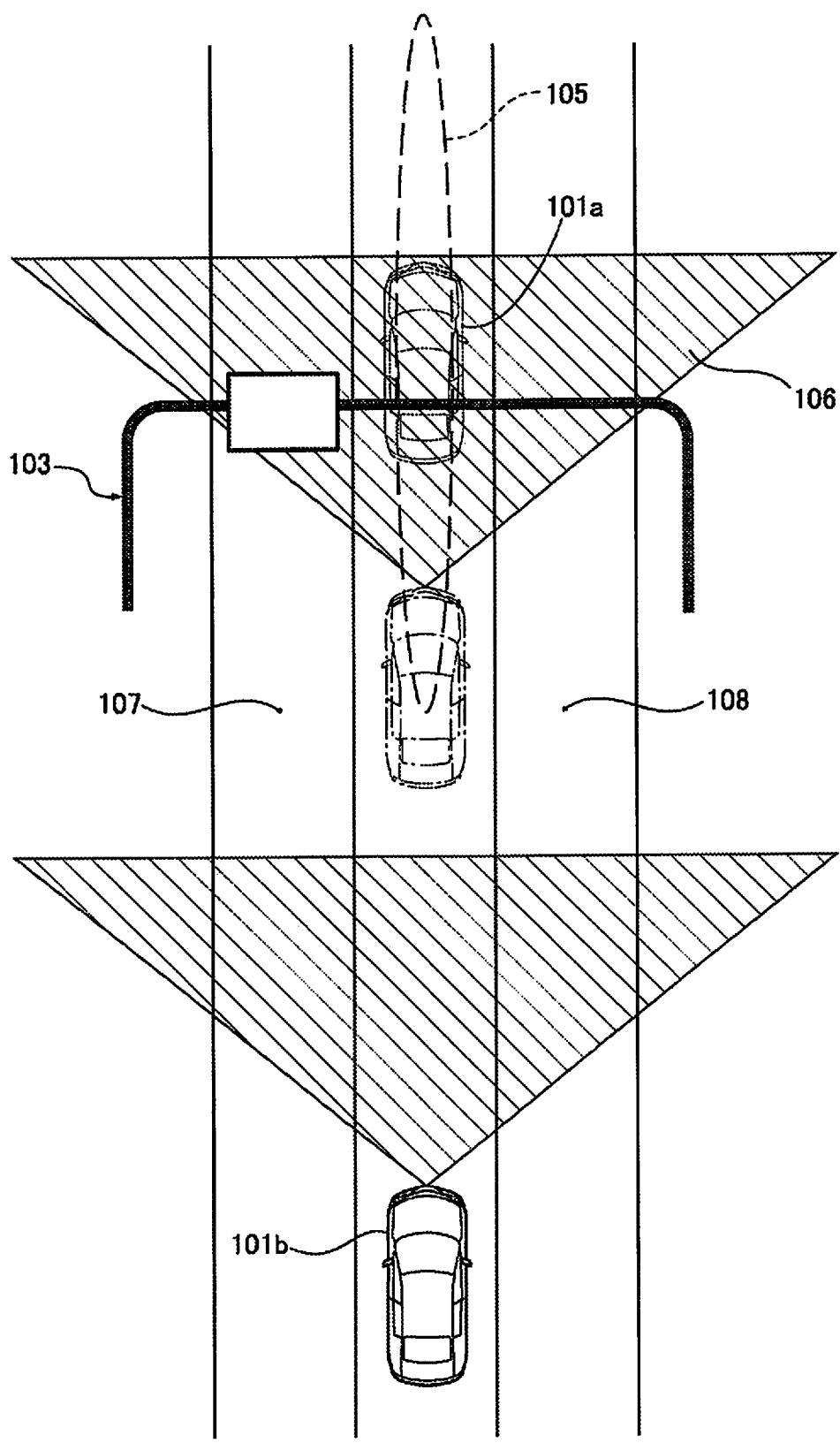
FIG. 8 is an explanatory view explaining the action of increasing the probability of target detection in a scenario in which an estimated position error exceeds a threshold error.

That is, as shown in FIG. 8, a case in which the host vehicle position set on the electronic map data is position 101a is considered. At this time, let us assume that the estimated position error is ±0.2 m in the vehicle width direction and ±5.0 m in the longitudinal direction of the vehicle, that the threshold error is 5.0 m, and that the photographing range of the camera 11 is 5-50 m from the host vehicle 101. Since the vehicle width direction can be corrected based on the white road lines, only the error in the longitudinal direction of the vehicle will be considered. If the estimated position error is maximal, the range of 1-55 m from the road sign 103 becomes the range that would be predicted at being photographable with the camera 11. If the host vehicle 101 is present within the estimated position error range, it is thought that the road sign 103 can be detected at least once while the host vehicle 101 is traveling within this estimated position error range (range surrounded by broken line 105 in FIG. 8).

On the other hand, when it is assumed that the host vehicle 101 is traveling within this estimated position error range and the road sign 103 cannot be detected even once, it can be thought that the photographing range 106 is being blocked by the preceding vehicle, or that the true host vehicle position is at position 101b and that an estimated position error that is greater than or equal to the threshold error is occurring. Therefore, it is determined whether the estimated position error is greater than or equal to the threshold error based on the photographed image from the camera 11 and the estimated position of the host vehicle 101.

Then, if the estimated position error (estimated based on the correction-not-possible period) is greater than or equal to the threshold error, an affirmative determination is made in Step S6, and the process proceeds to Step S9. Then, the "position lost mode" is selected as the position mode. As a result, the target lane is set to the lane farthest to the left (leftmost lane 107) on the road on which the host vehicle is traveling, and the target inter-vehicular distance is set to the first target inter-vehicular distance L1. Therefore, by carrying out an automatic lane change to the leftmost lane 107, which is the target lane, the host vehicle 101 moves to a lane from which it becomes easier to detect the road sign 103, which is the target described in the electronic map data. Thus, even if the estimated position error is large, it is possible to reduce the risk of decreased probability of a self-location correction.

In the first embodiment, an example was presented in which, when the "position lost mode" is selected as the position mode, the target lane is set to the leftmost lane 107, and the position where the host vehicle 101 travels is changed to the leftmost lane 107 by means of an automatic lane change. However, for example, it may be configured such that the automatic driving mode is canceled, and the mode is switched to manual driving mode, in which the driver himself or herself drives. In addition, if it is determined that lane change to this leftmost lane 107 is not actually possible even if the target lane is set to the leftmost lane 107, the target lane is set to the rightmost lane 108, and an automatic lane change may be carried out toward the rightmost lane 108. Even in this case, it is possible to travel in a lane from which a target at the end of the road can be relatively easily detected and to suppress the risk of decreased probability of a self-location correction.

The effects are described below. The following effects are obtained with the driving assist method and the driving assist device according to the first embodiment.

A driving assist method using a controller (position mode controller 40) that sets a target inter-vehicular distance from the host vehicle 101 to the preceding vehicle 102 traveling immediately in front of the host vehicle 101 is configured to comprise determining whether there is a request to execute a correction of a host vehicle position set on map data (electronic map data), based on a result of comparing position information on a target (road sign 103) described on the map data (electronic map data) with position information on the target (road sign 103) acquired by using the camera 11 of the on-board sensor 1 installed in the host vehicle 101 (Step S1), setting the target inter-vehicular distance to the preset first target inter-vehicular distance L1 if the execution request has not been made (Step S7), and setting the target inter-vehicular distance to the second target inter-vehicular distance L2, which is longer than the first target inter-vehicular distance L1, if the execution request has been made (Step S8).

As a result, it is possible to reduce the probability of missing an opportunity to correct the host vehicle position set on the electronic map data.

In addition, after determining that the execution request has been made (Step S1), it is determined whether the correction-not-possible period, in which the self-location correction cannot be executed, has continued for the preset threshold period or more (Step S2), and if the correction-not-possible period has continued for the threshold period or more, the target inter-vehicular distance is set to the second target inter-vehicular distance (Step S8).

As a result, it is possible to prevent the target inter-vehicular distance from being set unnecessarily long and to suppress a reduction in the chance for correction while suppressing changes in the inter-vehicular distance.

Additionally, after determining that the execution request has been made (Step S1), it is determined whether there is traffic congestion in the lane (host vehicle lane 104) in which the host vehicle 101 is traveling (Step S4), and if it is determined that there is traffic congestion, the target inter-vehicular distance is set to the second target inter-vehicular distance (Step S8).

As a result, it is possible to set the target inter-vehicular distance to the relatively long second target inter-vehicular distance when the inter-vehicular distance becomes short due to traffic congestion and there is a high probability of missing a chance to make the self-location correction, in order to thereby reduce the probability of missing an opportunity to make the correction.

Then, the determination that the traffic congestion has occurred is made when a state in which the speed of the host vehicle 101 has become a prescribed vehicle speed or less has continued for a prescribed period of time (first traffic congestion determination time) or more (Steps S11 to S13 and Step S18).

It is thereby possible easily to determine that there is traffic congestion, and to appropriately create a situation in which the execution of the self-location correction becomes possible.

In addition, the camera 11 of the on-board sensor 1 has a detection range (photographing range) from which information related to the target (road sign 103) can be acquired, and a determination that there is traffic congestion is made when it is determined that at least a prescribed range of the detection range (photographing range) is being blocked by the preceding vehicle 102 Steps S14 and S18).

It is thereby possible to create a suitable situation in which the execution of the self-location correction becomes possible, while recognizing a situation that makes it is difficult to detect the target (road sign 103, etc.).

Additionally, a determination that there is traffic congestion is made when a state in which the actual inter-vehicular distance from the host vehicle 101 to the preceding vehicle 102 has become a prescribed distance or less has continued for at least a prescribed preset period of time (second traffic congestion determination time) (Steps S15 to S18).

It is thereby possible to easily determine that there is traffic congestion and to appropriately create a situation in which the execution of the self-location correction becomes possible.

In addition, in a driving assist device comprising a controller (position mode controller 40) that sets a target inter-vehicular distance from the host vehicle 101 to the preceding vehicle 102 traveling immediately in front of the host vehicle 101, the controller (position mode controller 40) includes a request determination unit 41 for determining whether there is a request to execute a correction of a host vehicle position set on map data (electronic map data) based on a result of comparing information regarding position information of a target (road sign 103) described on the map data (electronic map data) with position information regarding the target (road sign 103) acquired by using the camera 11 of the on-board sensor 1 installed in the host vehicle 101, and a target inter-vehicular distance setting unit (position mode selection unit 46) that sets the target inter-vehicular distance to the preset first target inter-vehicular distance L1 when a determination result (request determination information) that the execution request has not been made is input from the request determination unit 41, and sets the target inter-vehicular distance to the second target inter-vehicular distance L2, which is longer than the first target inter-vehicular distance L1, when the execution request has been made.

As a result, it is possible to reduce the probability of missing an opportunity to correct the host vehicle position set on the electronic map data.

The driving assist method and the driving assist device of the present disclosure were described above based on the first embodiment, but specific configurations thereof are not limited to this first embodiment, and various modifications and additions to the design can be made without departing from the scope of the invention according to each claim in the Claims.

In the first embodiment, an example was presented in which the driving assist method and the driving assist device of the present disclosure are applied to a scenario in which a target inter-vehicular distance is set when a preceding vehicle 102 is followed during travel in automatic travel mode. However, the invention is not limited thereto. For example, the driving assist method and the driving assist device of the present disclosure can also be applied to a driving-assisted vehicle that issues a warning via the HMI device 6 when the vehicle is too close to the preceding vehicle 102 during travel in manual travel mode in which the driver himself or herself drives the host vehicle 101. That is, even in manual travel mode, the target inter-vehicular distance serving as a standard for issuing a warning is set to the second target inter-vehicular distance L2 if there is an execution request for self-location correction. It is thereby possible to prevent the inter-vehicular distance from the host vehicle 101 to the preceding vehicle 102 from becoming short. Then, since it is possible to prevent the inter-vehicular distance from becoming short, it becomes easier to detect the target with the camera 11, and it is possible to reduce the probability of missing an opportunity to make a self-location correction.

Additionally, in the first embodiment, an example was presented in which, if it is determined that the execution of the self-location correction has been completed, or if it is determined that the execution of the self-location correction will not be completed within a prescribed period of time from the output of the execution request for self-location correction, the request flag is set to "zero." Then, request determination information that there is no execution request for a self-location correction is output, and the "normal mode" is selected as the position mode. That is, in the first embodiment, when the "long inter-vehicular distance mode" is selected as the position mode and the target inter-vehicular distance is set to the second target inter-vehicular distance L2, if the execution of the self-location correction is not completed within the prescribed period of time, the "normal mode" is temporarily selected, and the target inter-vehicular distance is set to the first target inter-vehicular distance L1. It is thereby possible to prevent a state in which the target inter-vehicular distance is long (state in which the second target inter-vehicular distance L2 is set) from being unnecessarily continued.

However, the invention is not limited thereto. For example, the request flag may be continuously set to "1," the "long inter-vehicular distance mode" may be selected as the position mode, and the target inter-vehicular distance may be continued to be set to the second target inter-vehicular distance L2, until the execution of the self-location correction is completed. It is thereby possible to suppress fluctuations in the target lane change. Additionally, regardless of the length of time during which the self-location correction cannot be executed, when the traveled distance after passing a target, such as a road sign, described in the electronic map data reaches a prescribed distance, the request flag may be set to "zero" and the "normal mode" may be selected as the position mode.

Additionally, in the first embodiment, an example was presented in which the traffic congestion determination control process shown in FIG. 5 is executed to determine whether there is traffic congestion in the host vehicle lane, but the invention is not limited thereto. For example, the presence or absence of traffic congestion may be determined based on traffic congestion information acquired by means of communication with the external data communication device 3.

Furthermore, in the first embodiment, an example was presented in which the camera 11 (front recognition camera) is used as the on-board sensor 1 that is installed in the host vehicle 101 and used for detecting targets, but the invention is not limited thereto. For example, a self-location correction may be carried out based on position information of a target detected using the radar 12.

Additionally, in the first embodiment, an example was presented in which the self-location correction is executed based on a result of comparing position information of a target described on the map data with position information of the target acquired by the camera 11, but the invention is not limited thereto. For example, the self-location correction may be carried out based on the result of comparing shape information on the target (road markings, white road lines, etc.) described in the map data with shape information of the target (road markings, white road lines, etc.) acquired by the camera 11.

The invention claimed is:

1. A driving assist method using a controller that sets a target inter-vehicular distance from a host vehicle to a preceding vehicle traveling immediately in front of the host vehicle, the driving assist method comprising:
   determining whether there is a request to execute a correction of a host vehicle position set on map data, based on a result comparing information of a target described on the map data with information of the target acquired by using an on-board sensor installed in the host vehicle;
   setting the target inter-vehicular distance to a preset first target inter-vehicular distance upon determining the execution request has not been made; and
   after determining that the execution request has been made, determining whether there is traffic congestion in a lane in which the host vehicle is traveling, and upon determining that there is traffic congestion, setting the target inter-vehicular distance to a second target inter-vehicular distance, which is longer than the first target inter-vehicular distance, upon determining the execution request has been made.

2. The driving assist method according to claim 1, wherein
   a determination that there is traffic congestion is made when a state in which the speed of the host vehicle is at or below a prescribed vehicle speed has continued for at least a prescribed preset period of time.

3. The driving assist method according to claim 1, wherein
   the on-board sensor has a detection range from which information of the target can be acquired, and
   a determination that there is traffic congestion is made upon determining that at least a prescribed range of the detection range is being blocked by the preceding vehicle.

4. The driving assist method according to claim 1, wherein
   a determination that there is traffic congestion is made upon determining a state in which an inter-vehicular distance from the host vehicle to the preceding vehicle is a prescribed distance or less has continued for at least a prescribed preset period of time.

5. A driving assist device comprising:
   a controller configured to set a target inter-vehicular distance from a host vehicle to a preceding vehicle traveling immediately in front of the host vehicle,
   the controller including
   a request determination unit configured to determine whether there is a request to execute a correction of a host vehicle position set on map data, based on a result of comparing information related to a target described on the map data with information related to the target acquired by using an on-board sensor installed in the host vehicle, and
   a traffic congestion determination unit configured to determine whether there is traffic congestion in a lane in which the host vehicle is traveling when a determination result that the execution request has been made is input from the request determination unit, and
   a target inter-vehicular distance setting unit configured to set the target inter-vehicular distance to a preset first target inter-vehicular distance when a determination result that the execution request has not been made is input from the request determination unit, and that sets the target inter-vehicular distance to a second target inter-vehicular distance, which is longer than the first target inter-vehicular distance, when a determination result that there is traffic congestion is input from the request determination unit.

6. A driving assist method using a controller that sets a target inter-vehicular distance from a host vehicle to a preceding vehicle traveling immediately in front of the host vehicle, the driving assist method comprising:
   determining whether there is a request to execute a correction of a host vehicle position set on map data, based on a result of comparing information of a target described on the map data with information of the target acquired by using an on-board sensor installed in the host vehicle;
   setting the target inter-vehicular distance to a preset first target inter-vehicular distance upon determining the execution request has not been made; and
   determining, after determining that the execution request has been made, whether a correction-not-possible period, in which the correction cannot be executed, has continued for at least a preset threshold period, and upon determining that the correction-not-possible period has continued for at least the threshold period, setting the inter-vehicular distance to a second target inter-vehicular distance, which is longer than the first target inter-vehicular distance, upon determining the execution request has been made.

7. A driving assist device comprising:
   a controller that sets a target inter-vehicular distance from a host vehicle to a preceding vehicle traveling immediately in front of the host vehicle,
   the controller including
   a request determination unit configured to determine whether there is a request to execute a correction of a host vehicle position set on map data, based on a result of comparing information of a target described on the map data with information of the target acquired by using an on-board sensor installed in the host vehicle,
   a correction-not-possible period determination unit configured to determine whether a correction-not-possible period, in which the correction cannot be executed, has continued for at least a preset threshold period, upon determining a determination result that the execution request has been made is input from the request determination unit, and
   a target inter-vehicular distance setting unit configured to set the target inter-vehicular distance to a preset first target inter-vehicular distance when a determination result that the execution request has not been made is input from the request determination unit, and sets the target inter-vehicular distance to a second target inter-vehicular distance, which is longer than the first target inter-vehicular distance, when a determination result that the correction-not-possible period has continued for at least the threshold period is input from the correction-not-possible period determination unit.

* * * * *